United States Patent [19]
Gregg

[11] 4,081,569
[45] Mar. 28, 1978

[54] COFFEE BLEND COMPRISING GROUND-ROASTED AND ROASTED-GROUND COFFEE BEANS

[75] Inventor: Richard Gregg, Greenhills, Ohio

[73] Assignee: The Procter & Gamble Company, Cincinnati, Ohio

[21] Appl. No.: 336,647

[22] Filed: Feb. 28, 1973

[51] Int. Cl.$^2$ .............................................. A23F 1/02
[52] U.S. Cl. ..................... 426/595; 426/466
[58] Field of Search ............... 426/285, 388, 193, 464, 426/466, 473, 518, 148, 594, 595

[56] References Cited

U.S. PATENT DOCUMENTS

| | | | |
|---|---|---|---|
| 645,535 | 3/1900 | Linde | 426/28 |
| 1,073,929 | 9/1913 | Rosewater | 426/464 X |
| 2,097,591 | 11/1937 | Finley | 426/467 |
| 2,133,559 | 10/1938 | Mushaben | 426/407 |
| 2,198,207 | 4/1940 | Musher | 426/388 |
| 3,544,331 | 12/1970 | Hair et al. | 426/388 |
| 3,706,574 | 12/1972 | Mahlmann et al. | 426/464 X |
| 3,796,805 | 3/1974 | Lemmonier et al. | 426/388 |

*Primary Examiner*—Frank W. Lutter
*Assistant Examiner*—Jon Hokanson
*Attorney, Agent, or Firm*—Leonard Williamson

[57] ABSTRACT

A blended coffee product comprising subsequently roasted ground green coffee beans (ground-roasted) and conventional whole bean roasted ground coffee (roasted-ground), and a method of its preparation including the steps of comminuting green coffee beans, roasting the comminuted green beans and mixing these roasted comminuted beans with conventional roast and ground coffee.

3 Claims, No Drawings

COFFEE BLEND COMPRISING GROUND-ROASTED AND ROASTED-GROUND COFFEE BEANS

BACKGROUND OF THE INVENTION

This invention relates to a roast coffee of the type which is typically packed in vacuum tins. More particularly, this invention relates to a blended ground coffee product and to a method for its preparation. The blended product comprises from about 10 to about 70 wt. % of a coffee which is obtained by comminuting green coffee beans prior to roasting (ground-roasted); the balance of the blend comprising the more conventionally employed coffee, i.e., whole bean roasted coffee wherein the roasting step precedes any comminuting steps (roasted-ground). Decaffeinated coffee blends constitute an embodiment of this invention.

For purposes herein the term "ground-roasted" will refer to that component of the coffee blend of this invention which is obtained by first comminuting (grinding or cutting) and then roasting green coffee beans. By "comminuting" is meant both clean cut subdivision of green coffee beans and grinding of green coffee beans. Commercially available green coffee beans are typically sun-dried and quite frangible so that comminution by grinding is practicable. But green beans of high moisture content are also encompassed by the present invention. If the beans are truly fresh (undried), of if the beans have been hydrated, grinding, because of the high moisture content, may yield a macerated paste rather than clean particulate division occasioned by crisply cutting such hydrated beans or by grinding dried beans. All such forms of comminution are operable herein.

Prior to roasting, the comminuted green bean component may be decaffeinated by solvent extraction. Subsequent to the roasting step, the ground-roasted component may be subjected to an additional grinding step since roasting tends to expand the comminuted bean structure. Hence, the term "ground-roasted" has been defined to distinguish it from the more conventionally employed ground coffee which for purposes of contradistinction will hereinafter be referred to as "roasted-ground". Words of additional qualification will be employed where appropriate.

Of course the so-called roasted-ground component (whole bean roasted, then ground) is unquestionably the most conventional staple of the coffee art and requires no further identification or description. The so-called ground-roasted component of the present invention is also known in the art but is seldom utilized because of its cereal (straw-like) flavor. Representative examples of U.S. patents disclosing methods for the production of ground-roasted coffees are Nos. 2,097,591 and 3,706,574. Unexpectedly it has been discovered that certain blends of ground-roasted and roasted-ground coffees yield a flavor on brewing which possesses an interesting and highly desirable flavor. This flavor is most notable for its mildness, lack of bitterness (strength without bitterness), and reduced acidity.

Accordingly, it is an object of the present invention to provide a ground coffee blend and a method for its manufacture comprising ground-roasted and roasted-ground coffees. A second object of this invention is to provide a decaffeinated ground coffee product comprising a blend of roasted-ground or decaffeinated roasted-ground and decaffeinated ground-roasted coffees wherein the ground-roasted component is decaffeinated at a point subsequent to comminution but prior to roasting.

SUMMARY OF THE INVENTION

In its method aspect the present invention comprises blending a "ground-roasted" coffee with a "roasted-ground" coffee wherein said ground-roasted coffee is prepared by comminuting (cutting, grinding or macerating) green coffee beans, then roasting the comminuted beans to a pre-determined roast color. Subsequent to the roasting step, and if desired, the ground-roasted component may be subjected to a final grinding step. Also, if desired, subsequent to the comminuting step but prior to the roasting step the comminuted green beans may be subjected to a decaffeinating step by solvent extraction. The roasted-ground component which comprises the balance of the blend is the conventionally known ground coffee obtained by roasting whole beans prior to a grinding step. The roasted-ground component can also be decaffeinated.

Unexpectedly, it has been discovered that a coffee blend comprising from about 10 to about 70 wt. % of a ground-roasted coffee and from about 90 to about 30 wt. % of a roasted-ground coffee yields, on brewing, a coffee beverage having enhanced mildness, less bitterness with good strength, and less acidity.

DETAILED DESCRIPTION OF THE INVENTION

The ground-roasted component of the blended ground coffee product of this invention can be obtained by starting with any of the conventionally used and commercially available green coffee beans such as Columbian, Brazil, and Robustas. Robustas have strong distinctive flavors; they are bitter and contain varying degrees of a rubbery flavor note. Thus, Robustas are traditionally the lowest priced coffee beans, and their content in a conventional blend can strongly influence the taste of the blend. While many conventional coffee blends utilize at least some Robustas to contribute desirable flavor notes (and to reduce cost), the level of Robustas usage generally must be very limited because of the exceptionally strong characteristic flavor (principally bitterness) of Robustas. Quite surprisingly, however, the coffee blends of this invention are able to incorporate substantial amounts of Robustas. These blends are characterized by their mildness, popcorny flavor, low acidity and freedom from bitterness without sacrifice of strength and color. Prior to roasting, however, these beans are comminuted, preferably by grinding.

The type of grinding and the particle size distribution obtained thereby may vary widely. The three principal grinds recognized in the coffee art are "Fine", "Drip", and "Regular". These grinds are more fully characterized in Table I.

TABLE I
Standard Coffee Grinds, Average Particle Size, Number of Particles Per Unit Weight

| Particle Size Description | Size (mm) | No. Particle per gram | Amount Retained on U.S. Standard Mesh | | Amount Passing Through |
|---|---|---|---|---|---|
| | | | No. 10 and No. 14 Mesh (wt. %) | No. 20 and No. 28 Mesh (wt. %) | No. 28 Mesh (wt. %) |
| Regular | 1.0 | $1.3 \times 10^3$ | 33 | 55 | 12 |
| Drip | 0.75 | $3.1 \times 10^3$ | 7 | 73 | 20 |
| Fine | 0.38 | $25 \times 10^3$ | 0 | 70 | 30 |

For a more complete description of apparatus, procedures and standards in the coffee grinding art, see: Sivetz, M., and Elliott, H.E., *Coffee Processing Technology*, Vol. I, pp. 187-260; and U.S. Pat. No. 3,544,331.

Typically the green beans of this invention are reduced to a size wherein 10% to 60% of the particles will pass through a No. 16 mesh. The most preferred stage of subdivision is that wherein 15% to 30% of the divided particles pass through the No. 16 mesh.

In any event, whether the beans are macerated to a paste, cleanly cut, or ground, the comminuted beans are then subjected to a roasting operation which can be conducted with standard apparatus of the art, such as rotating heated drums and fluidized beds. A preferred, but certainly not a limiting means of roasting is by use of a rotating drum roaster such as that obtained from the Problat Wiernike Company which has a non-perforated drum which prevents the loss of fines. After a roasting interval to obtain the desired roast color, the roasted load is quenched by any of the conventionally employed quenching techniques such as forced cold air, or cold water spray. It is significant that even at dark roast using the cheapest green beans, such as the above-described Robustas, the ultimate blends of this invention yield mild-tasting brews. Thus, it is possible by practice of this invention to obtain coffee products possessing a burnt flavor note, good strength, and dark color without bitterness.

After the roasting step, since roasting tends to expand the comminuted bean's cellular structure, the ground-roasted coffee component can be subjected to a final grinding step or it can be blended with whole roasted coffee beans and ground therewith. Preferably the final grinding step should be conducted so that from about 10% to about 50% of the ground-roasted component particles pass through a No. 30 mesh; the most preferred final state of subdivision of the ground-roast component of the blend is that at which 15% to 25% of the particles pass through a No. 28 mesh screen (i.e., Drip grind).

The preferred blend ratio range of the ground coffee blends of this invention is from about 10 to about 70 wt. % of the ground-roasted component and from about 90 to about 30 wt. % roasted-ground component. The most preferred range is from about 25 to about 50 wt. % ground-roasted and from about 75 to about 50 wt. % roasted-ground.

Both or either of the component coffees of the blends of this invention can be decaffeinated. For example, to obtain a significantly decaffeinated blended coffee product, the green comminuted beans are treated to a solvent extraction step prior to the roasting step. The decaffeinating solvent can be water at a temperature of from about 100° F to 120° F according to the process of U.S. Pat. No. 2,309,092, or can be by means of an organic solvent conducted according to conventional procedures and apparatus such as, for example, U.S. Pat. No. 2,309,139.

The resulting coffee blend unexpectedly has a flavor quite unlike the individual flavors of the component coffees. That is, the ground-roasted component has, by itself, a most uninteresting, sometimes disagreeable cereal (straw-like) flavor, and the roasted-ground (i.e. whole bean roasted) component has, by itself, the traditional coffee flavor which is best described as rich and strong but certainly not mild. However, the blend of the two components possesses a delightfully mild subtle popcorny taste much preferred by certain coffee drinkers and is further characterized by a reduced acid taste.

The following examples will more specifically set forth the preferred but not limiting embodiments of the invention.

EXAMPLE 1

One pound of green coffee consisting of 25% Brazils, 35% Columbians, and 40% Robustas was placed in a Jabez, Burns & Son rotating drum laboratory roaster and roasted for 10 minutes to obtain a desired medium roast color. This product was then ground to a regular grind on an American Duplex Corporation model 480 grinder, and is hereinafter referred to as the "roasted-ground" coffee component.

One pound of green coffee consisting of the same blend as above for the roasted-ground component was comminuted on an American Duplex Corporation Model 480 grinder such that 20% of the resultant particles passed through a No. 16 mesh. The comminuted green beans were roasted for 10 minutes to obtain a desired medium dark roast color using a Jabez, Burns & Sons rotating drum laboratory roaster which was modified to have a non-perforated drum to prevent the loss of fines. Thereafter the roasted product was ground on an American Duplex Model 480 grinder to a drip grind. This product is hereinafter referred to as the "ground-roasted" component.

The above-described components were then blended at a 1:1 ratio by weight. Comparative taste tests showed that the brewed coffee beverage of Example 1 possessed enhanced mildness, less bitterness, and less acid than conventional roast and ground vacuum packed coffees.

Substantially equivalent flavor results are obtained when the blend weight ratio is changed to 1:9, 3:7, 4:6, 6:4, and 7:3 ground-roasted:roasted-ground, respectively.

Substantially equivalent flavor results are obtained when the ground-roasted component and when both the ground-roasted and the roasted-ground components, respectively, of Example 1 are decaffeinated according to the process of U.S. Pat. No. 2,309,092 prior to roasting.

Substantially equivalent flavor results are obtained when the green bean comminuting step of Example 1 is replaced by a comminuting step wherein the state of subdivision is classifiable as "Fine."

Blended coffees, as in Example I, possessing enhanced mildness, less bitterness, less acid and a characteristic subtle popcorny flavor are obtained when the ground-roasted component of Example I is replaced by 80% Brazils and 20% Robustas, 50% Brazils and 50% Robustas, 25% Brazils and 75% Robustas, and 100% Robustas, respectively.

Enhanced strength, without introduction of bitter flavor notes, is obtained when the ground-roasted component of Example 1 is roasted to a dark roast color.

What is claimed is:

1. A method of manufacturing a blended ground coffee comprising mixing from about 90 to about 30 wt. % of a conventional roasted and ground first coffee component with from about 10 to about 70 wt. % of a ground-roasted second coffee component comprising at least 20% by weight Robustas; wherein said second coffee component is obtained by
    (a) comminuting green coffee beans, and
    (b) roasting the comminuted green beans of step (a).

2. The method of claim 1 wherein the green comminuted beans of step (a) are decaffeinated prior to roasting step (b).

3. The method of claim 2 wherein the conventional roasted and ground coffee is decaffeinated.

* * * * *